US007683832B2

(12) United States Patent
Hansen, Jr. et al.

(10) Patent No.: US 7,683,832 B2
(45) Date of Patent: Mar. 23, 2010

(54) METHOD FOR FUSING MULTIPLE GPS MEASUREMENT TYPES INTO A WEIGHTED LEAST SQUARES SOLUTION

(75) Inventors: Joseph H. Hansen, Jr., Kaysville, UT (US); William G. Wright, Sandy, UT (US)

(73) Assignee: Sierra Nevada Corporation, Sparks, NV (US)

( * ) Notice: Subject to any disclaimer, the term of this patent is extended or adjusted under 35 U.S.C. 154(b) by 0 days.

(21) Appl. No.: 11/838,133

(22) Filed: Aug. 13, 2007

(65) Prior Publication Data
US 2008/0036654 A1      Feb. 14, 2008

Related U.S. Application Data

(60) Provisional application No. 60/822,195, filed on Aug. 11, 2006.

(51) Int. Cl.
*G01S 1/02* (2006.01)
*G01C 21/00* (2006.01)

(52) U.S. Cl. .......................... 342/357.12; 342/357.06; 342/357.15

(58) Field of Classification Search ............ 342/357.04, 342/357.06, 357.12, 357.15; 701/207, 213, 701/215
See application file for complete search history.

(56) References Cited

U.S. PATENT DOCUMENTS

| 5,991,691 A | 11/1999 | Johnson |
| 2006/0074558 A1 | 4/2006 | Williamson et al. |

OTHER PUBLICATIONS

International Search Report from European Patent Office on corresponding PCT Application (PCT/US2007/075832) dated Oct. 20, 2008.
Written Opinion from European Patent Office on corresponding PCT Application (PCT/US2007/075832) dated Oct. 20, 2008.

*Primary Examiner*—Dao L Phan
(74) *Attorney, Agent, or Firm*—Klein, O'Neill & Singh, LLP

(57) ABSTRACT

A method of calculating position data for an airborne aircraft using a GPS-based airborne navigation system includes the processing of a position component of a relative state function by fusing a plurality of different types of measurement data available in the GPS-based system into a weighted least squares algorithm to determine an appropriate covariance matrix for the plurality of different types of measurement data.

29 Claims, 4 Drawing Sheets

METHOD FOR FUSING MULTIPLE GPS MEASUREMENT TYPES INTO A WEIGHTED LEAST SQUARES SOLUTION

CROSS-REFERENCE TO RELATED APPLICATION

This applications claims the benefit under 35 U.S.C. Section 119(e), of Provisional Application No. 60/822,195, filed Aug. 11, 2006, the disclosure of which is incorporated herein by reference in its entirety.

FEDERALLY SPONSORED RESEARCH OR DEVELOPMENT

Not Applicable

BACKGROUND

1. Field of the Invention

The present invention relates to Global Positioning System (GPS)-based Relative Navigation Systems, and more particularly to a method for processing the relative state of the position component of an airborne navigation system.

2. Background of the Invention

A need has been found for providing a rapidly deployable, adverse weather, adverse terrain, day-night, survivable, and mobile precision approach and landing capability that supports the principles of forward presence, crisis response and mobility. The capability should enable military forces to land on any suitable surface world wide (land and sea), under both peace time and hostile conditions, with ceiling and/or visibility the limiting factor.

The Joint Precision Approach and Landing System (JPALS) is an integral part of such a strategic system. JPALS is a differential GPS that provides a rapidly deployable, mobile, adverse weather, adverse terrain, day-night, and survivable precision approach and landing capability. The JPALS allows an aircraft to land on any suitable land or sea-based surface worldwide, while minimizing the impact to airfield operations, because of low ceiling or poor visibility. This approach and landing system provides the capability of performing conventional and special operations from a fixed-base, shipboard, and austere environments under a wide range of meteorological and terrain conditions.

One of the primary functions of sea-based JPALS is to determine the relative state (position, velocity and acceleration) of an airborne vehicle with respect to its assigned ship. This function is called "Relative State Function" or "Relative Navigation" ("RelNav"). Existing civil and military systems do not satisfy JPALS requirements because they have a number of shortcomings that limit joint operations. The multiplicity of systems, in and of itself, hinders inter-Service, civil, and allied operations.

Among the limitations of conventional systems, especially as applied to calculating position data of an aircraft closing in on a target, is that in order to calculate an aircraft's position, numerous measurements must taken. Certain measurement types have better accuracy but require more processing time to achieve results. Traditionally, four measurements of the same type are needed to be used in a solution; otherwise optimal solutions can not be made available. Conventional methods that use a weighted least squares position solution use only a single measurement type. Furthermore, conventional methods have been less than satisfactory when relative position estimation is needed between two moving vehicles (e.g., between an aircraft and a ship).

SUMMARY OF THE INVENTION

As used herein, the terms "invention" and "present invention" are to be understood as encompassing the invention described herein in its various embodiments and aspects, as well as any equivalents that may suggest themselves to those skilled in the pertinent arts.

The present invention provides a novel and effective system and method for a GPS-based airborne navigation system to process the position component of the Relative State Function by fusing different types measurement data, i.e., data representing several different measured parameters. More specifically, the present invention provides an improved method of calculating the position data of aircraft closing in on target locations.

The present invention enhances the speed and accuracy of such position calculations. This is accomplished by the fusing some or all of the different types of measurement data available in a GPS-based system into a weighted least squares algorithm to determine the appropriate covariance matrix, given the different measurement types. This method allows optimal accuracy in the position solution by including all satellites, and their best available measurements. Moreover, the invention can operate and provide satisfactory results whenever relative position estimation is needed between two vehicles (e.g., an aircraft and a ship).

DETAILED DESCRIPTION OF THE PREFERRED EMBODIMENTS

The following definitions are provided as they are typically (but not exclusively) used in GPS-based navigation systems implementing the various adaptive aspects of the present invention.

The GPS is a satellite-based navigation system having a constellation of 24 Earth orbiting satellites. These satellites are approximately uniformly dispersed around six circular orbits having four satellites in each orbit. Each GPS satellite transmits at two frequencies: L1 (1575.42 MHz) and L2 (1227.60 MHz). The L1 frequency has two different spread-spectrum codes modulated on it: a coarse acquisition (CA) code, and a Y code. The Y code is also modulated onto the L2 carrier.

Earth centered, Earth fixed (ECEF) is a Cartesian coordinate system used for GPS. It represents positions as X, Y, and Z coordinates in meters. The point (0,0,0) denotes the center of the earth, hence the name Earth-Centered.

World Geodetic System of 1984 (WGS 84) a geodetic reference systems used by GPS and developed by the U.S. Defense Mapping Agency.

Double Difference (technique) is a measurement method using two receivers. Differences are formed at each measurement epoch between two satellites on each receiver and then between the same two receivers.

To better understand the invention, an overall system description is given, and the function and operation of the present invention will be described in specific detail.

Figure 1:
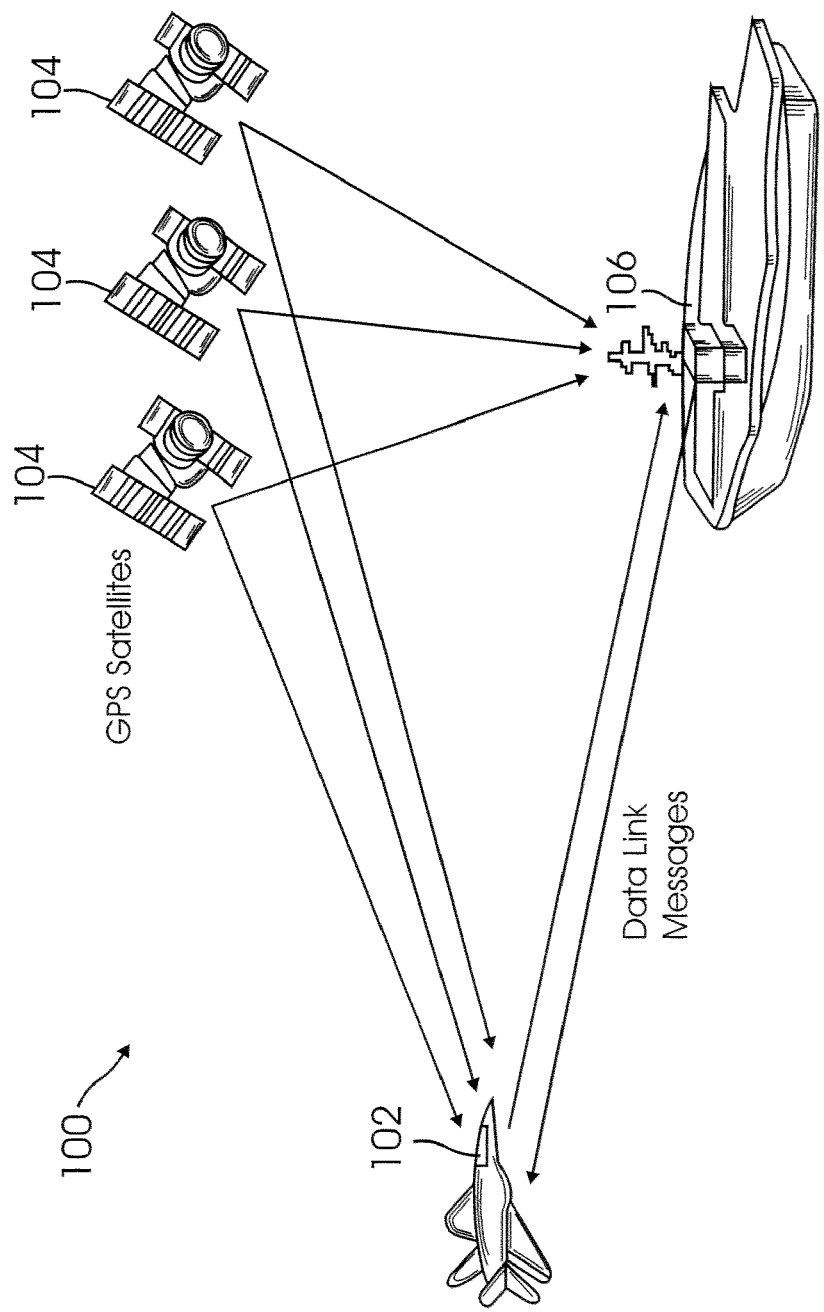
FIG. 1 is an illustration of the overall set up of a relative navigation system, of the type in which the system and method of the present invention may be employed.

FIG. 1 shows an overall set up for a relative navigation system 100 between an aircraft 102 and a ship 106. Both the aircraft 102 and the ship 106 receive L1 and L2 GPS measurements from a GPS satellite constellation 104. The ship 106 processes its measurement data to generate its state (position, velocity) and estimated wide lane phase ambiguities. Ship measurement data are generated from as many as 4 GPS antennas. The computed ship state (position, velocity) and estimated wide lane phase ambiguities are broadcast, using radio frequencies, for use by all aircraft within broadcast range of the ship.

The aircraft 102 combines its own measurements with the ship measurements, state, and ambiguities received over the broadcast, to produce a relative vector solution between its own GPS antenna and the ship's reference point. It also determines the quality of the relative vector solution.

Figure 2:
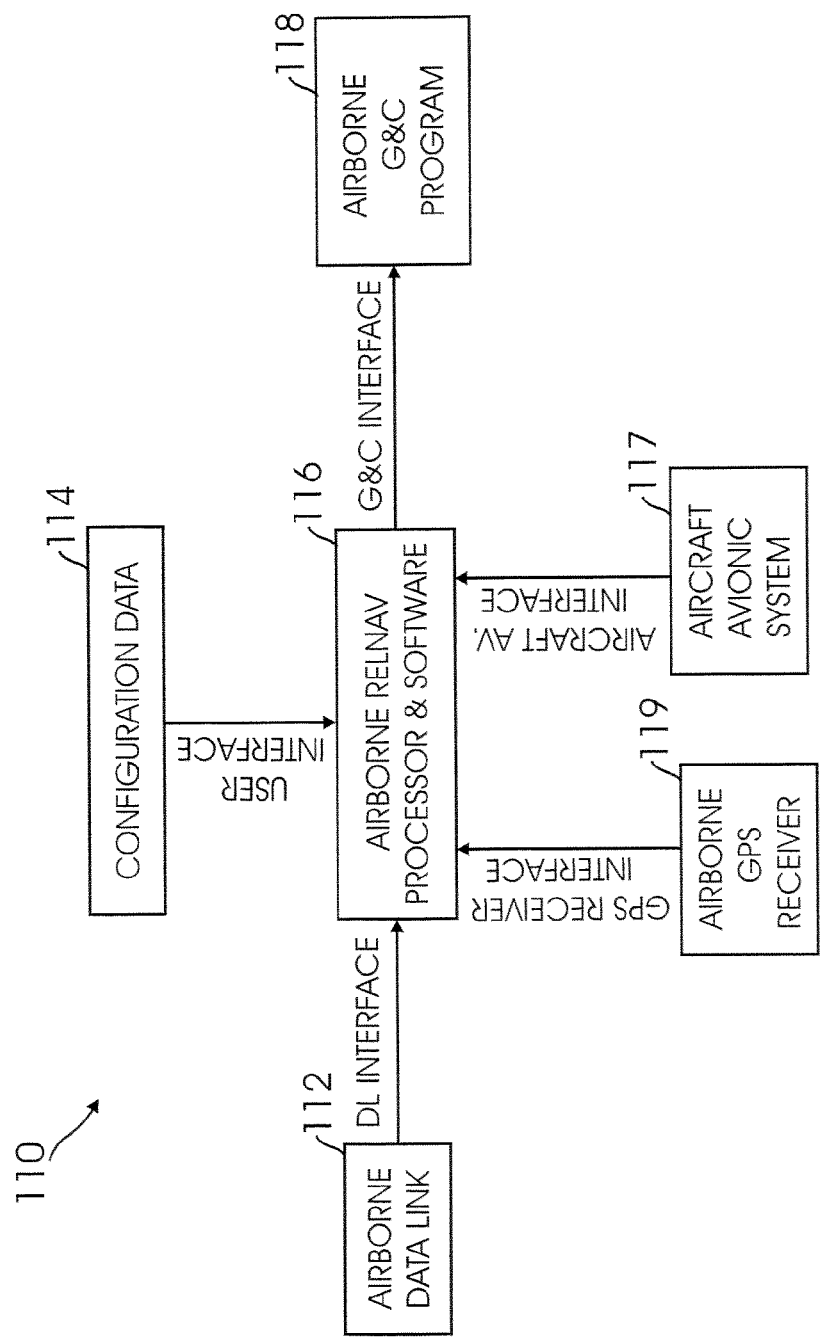
FIG. 2 is an architectural block diagram of an airborne relative state system that includes an airborne RelNav computer system and interfaces.

Referring to FIG. 2, an Airborne Relative State System 110 includes an Airborne RelNav computer system 116 that computes the relative position and velocity vector between the ship 106 and the aircraft 102. It also computes the uncertainty of the computed position and velocity vectors. The computed relative state and its uncertainty are inputted to a guidance and control (G&C) system 118 for guidance and control of the aircraft 102.

Figure 3:
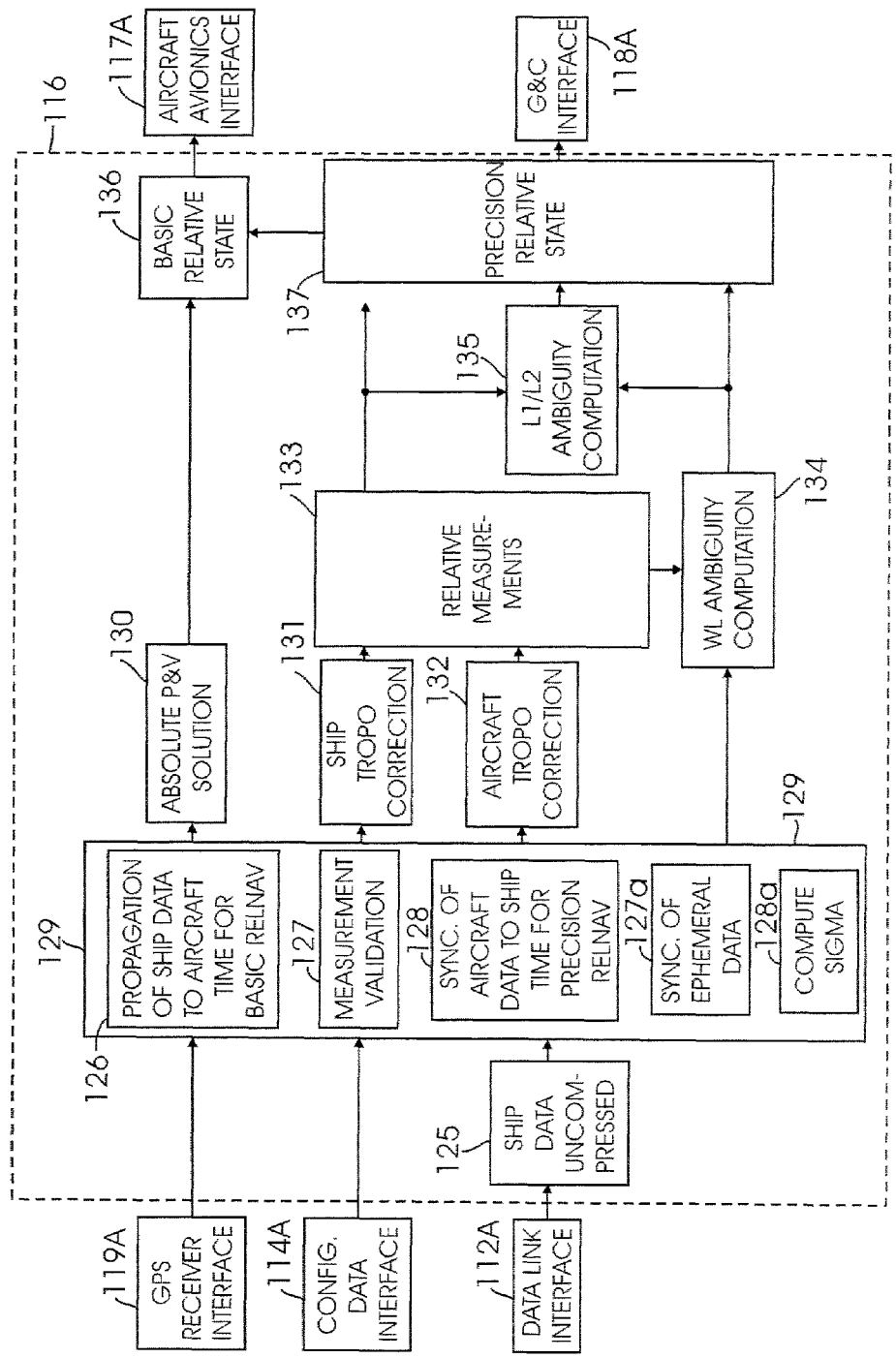
FIG. 3 is a flow diagram showing major functional/processing blocks of an airborne RelNav system including the RelNav computer system and interfaces.

To assure system modularity, the interfaces in the airborne relative state system 110 are well defined. Five such interfaces are shown in FIGS. 2 and 3:

Aircraft Avionic System 117 and its associated avionics interface (AI) 117A;

Airborne GPS receiver 119 and its associated GPS receiver interface (AGRI) 119A;

Airborne Data Link 112 and its associated data link interface (DLI) 112A;

Configuration data 114 and its associated configuration date interface (CDI) 114A; and Airborne Guidance and Control system 118 and its associated guidance and control interface (GCI) 118A.

The Relative State Function has been partitioned into several sub-functions, as illustrated in FIG. 3. The algorithms to implement each sub-function are not described; only the sub-functions performed are identified. A detailed description of functionality and algorithmic implementation is provided only for the Precision Relative State module (PRS) 137, since its architecture and operation embody the present invention.

The functional representation of the RelNav computer system 116 in FIG. 3 identifies nine functional blocks along with three sub-blocks. A Measurement Management and Validation (MMV) function 129 receives data from Airborne GPS receivers 119 via the AGRI 119A, Configuration Data 114 via the CDI 114A, and Ship Data Uncompressed (DU) 125 via the DLI 112A. The DU 125 converts ship position and velocity data to WGS-84 ECEF coordinates. The MMV function 129 validates Pseudo Range (PR) and Carrier Phase (CP) data ("Measurement Validation" 127), synchronizes the use of ephemeral data between ship and aircraft ("Sync. of Ephemeral Data" 127a), propagates ship position and velocity data to aircraft time ("Propagation of Ship Data . . . " 126), synchronizes aircraft measurements to ship time ("Sync. of Aircraft Data . . . " 128), and computes the sigma value of each aircraft GPS measurement ("Compute Sigma" 128a).

A Ship Troposphere Correction (STC) function 131 applies tropospheric corrections to ship GPS measurements. An Aircraft Troposphere Correction function (ATC) 132 applies tropospheric corrections to aircraft GPS measurements. An Absolute Position and Velocity (APV) function 130 computes the aircraft's absolute position, the positions of satellites from the ephemeral data, and the aircraft's absolute velocity solution. A Relative Measurements (PM) function 133 calculates Double-Difference (DD) measurements (L1 PR, L2 PR, L1 CP, L2 CP, WL CP, NL PR) at ship time, and calculates variance components (multipath and noise, ionosphere corrections, troposphere corrections) of DD measurements from Single-Difference (SD) measurements (L1 PR, L2 PR, L1 CP, L2 CP, WL CP, NL PR) and variances at ship time. The satellite highest in elevation is chosen as a reference, and the PM function 133 calculates covariance matrices components (multipath and noise, ionosphere corrections, troposphere corrections) of the DD measurements. Since ship measurements may come from four separate antennas, four separate solutions may be required.

A Wide Lane Ambiguities (WLA) function 134 determines WL float ambiguities and covariance (Ship UD, Aircraft UD, SD, and DD). It determines the probability of correctly fixing WL ambiguities, and it also determines the Discrimination Ratio of integer ambiguities, validates integer ambiguities, and fixes WL ambiguities. An L1/L2 Ambiguities (L1L2A) function 135 is performed assuming WL fixed ambiguities have been resolved successfully. It determines L1 and L2 float ambiguities and covariance, determines the probability of correctly fixing L1 and L2 ambiguities, determines the Discrimination Ratio (DR) of resolved L1 and L2 integer ambiguities, validates integer ambiguities, and fixes L1 and L2 ambiguities. A Basic Relative State (BRS) function 136 computes a Basic Relative State (position and velocity) at aircraft time and computes a Covariance of Basic Relative State (position and velocity).

The G & C Interface (GCI) 118A provides precision relative state outputs to Guidance and Control functions, and it receives input from the Precision Relative State module (PRS) 137. The Avionics Interface (AI) 117A provides Basic Relative State outputs to the aircraft avionics system. The PRS module 137 determines a Precision Relative State only if an aircraft's distance to the ship is less than 10 nautical miles A satellite should only be considered in a particular solution if its measurements have been consecutively available for a configurable amount of time. The initial interval is set at 30 seconds or 60 samples.

Figure 4:
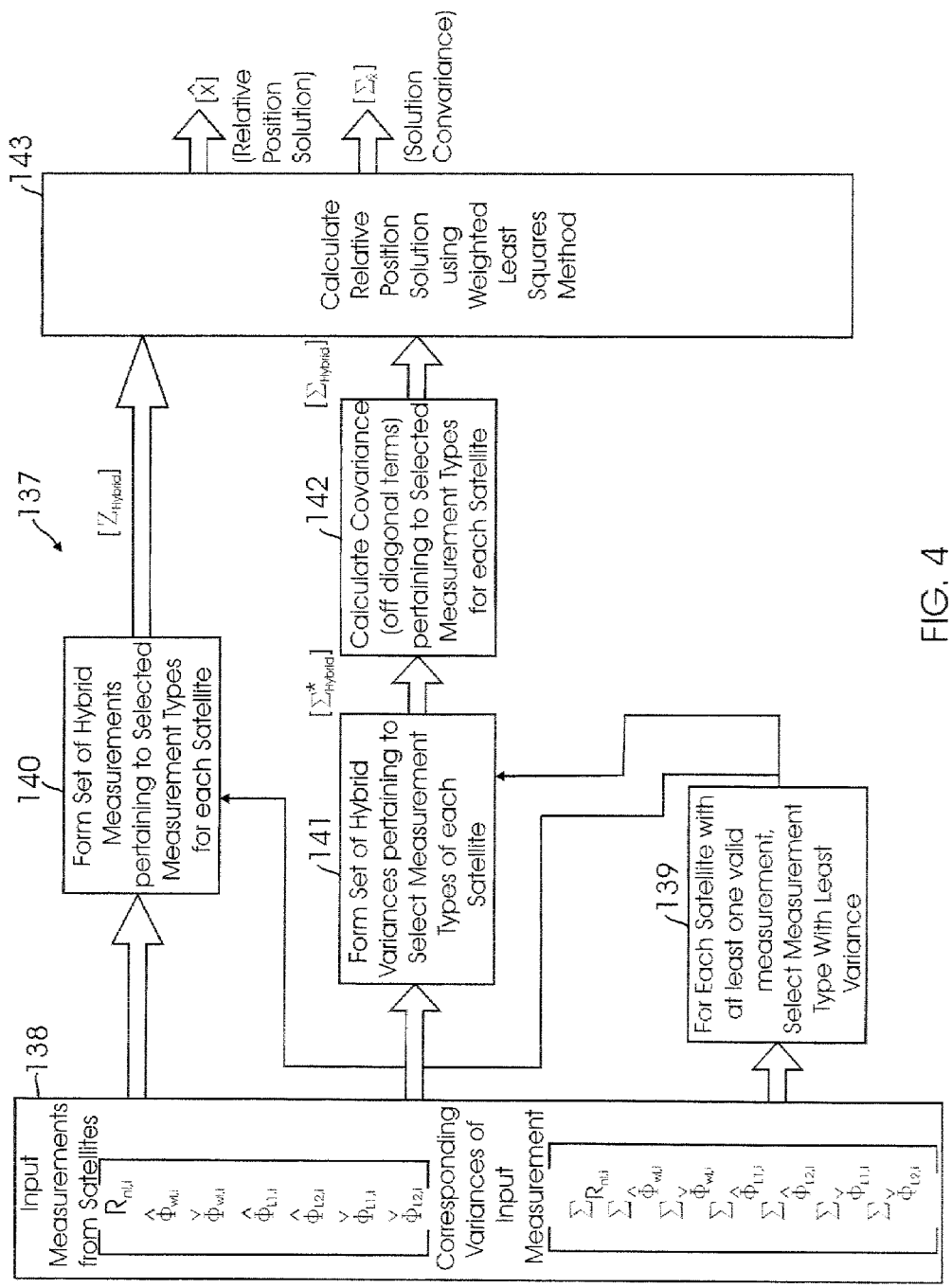
FIG. 4 is a flow chart identifying process steps to calculate position data in accordance with present invention.

A functional block diagram for the Precision Relative State (PRS) module 137 is shown in FIG. 4, illustrating the different calculations performed to arrive at a Precision Relative State solution. A first computing module 138 computes code range and phase range values from Measurements and Covariance. DD NL Code Range Observables are calculated by Equations (1), (2) and (3):

$$\lambda_{nl} = \frac{\lambda_1 \lambda_2}{\lambda_2 + \lambda_1} \quad (1)$$

$$R_{nl} = \lambda_{nl} \left[ \frac{R_1}{\lambda_1} + \frac{R_2}{\lambda_2} \right] \quad (2)$$

$$C_{R_{nl}} = \left(\frac{\lambda_{nl}}{\lambda_1}\right)^2 C_{DD\_L_1\_M,E} + \left(\frac{\lambda_{nl}}{\lambda_1}\right)^2 C_{DD\_L_2\_M,E} + C_{DD\_L_1\_tropo} + \left(\frac{\lambda_2}{\lambda_1}\right)^2 C_{DD\_L_1\_iono} \quad (3)$$

where $R_1$ and $R_2$ are DD code ranges

DD Phase Range Observables are calculated by Equations (4) to (9):

L1 Float:

$$\Phi_{1\_flo} = \Phi_1 - \lambda_1 N_{1\_flo}$$

$$C_{\Phi_1} = C_{DD\_L_1\_m,e} + C_{DD\_L_1\_iono} + C_{DD\_L_1\_tropo}$$

$$C_{\Phi_1\_flo} = C_{\Phi_1} + \lambda_1^2 C_{N_{1\_flo}} \quad (4)$$

L2 Float:

$$\Phi_{2\_flo} = \Phi_2 - \lambda_2 N_{2\_flo}$$

$$C_{\Phi_1} = C_{DD\_L_2\_m,e} + C_{DD\_L_2\_iono} + C_{DD\_L_2\_tropo}$$

$$C_{101_{2\_flo}} = C_{101_2} + \lambda_2^2 C_{N_{2\_flo}} \quad (5)$$

L1 Fixed:

$$\Phi_{1\_fix} = \Phi_1 - \lambda_1 N_{1\_fix}$$

$$C_{101_{1\_fix}} = C_{101_1} \quad (6)$$

L2 Fixed:

$$\Phi_{2\_fix} = \Phi_2 - \lambda_2 N_{2\_fix}$$

$$C_{101_{2\_fix}} = C_{101_2} \quad (7)$$

WL Float:- (8)

$$\lambda_{wl} = \frac{\lambda_1 \lambda_2}{\lambda_2 - \lambda_1}$$

$$\Phi_{wl} = \lambda_{wl} \left[ \left( \frac{\Phi_{DD\_L_1}}{\lambda_1} - \frac{\Phi_{DD\_L_2}}{\lambda_2} \right) \right]$$

$$C_{\Phi_{wl}} = \left( \frac{\lambda_{wl}}{\lambda_1} \right)^2 C_{DD\_L_1\_m,e} + \left( \frac{\lambda_{wl}}{\lambda_2} \right)^2 C_{DD\_L_2\_m,e} + C_{DD\_L_1\_tropo} + \left( \frac{\lambda_2}{\lambda_1} \right)^2 C_{DD\_L_1\_iono}$$

-continued $$\Phi_{wl\_flo} = \Phi_{wl} - \lambda_{wl} N_{wl\_flo}$$

$$C_{\Phi_{wl\_flo}} = C_{\Phi_{wl}} + \lambda_{wl}^2 C_{N_{wl\_flo}}$$

WL Fixed:

$$\Phi_{wl\_fix} = \Phi_{wl} - \lambda_{wl} N_{wl\_fix}$$

$$C_{101_{wl\_fix}} = C_{101_{wl}} \quad (9)$$

After the calculations are performed by the first computing module 138, first and second functional modules 139 and 140 select measurement data for further processing. The best data are selected based on measurement variance from each of the double difference pair, using the above-defined methods. The orders are: L1 fixed, L2 fixed, L1 float, L2 float, Wide Lane Fixed, Wide Lane Float, and Narrow Lane Code. This way every visible satellite is used in the solution, weighted only by its own relative uncertainty.

A third functional module 141 assembles data for a covariance matrix element calculation. The covariance matrix to be used in the solution is more difficult to generate than the other solutions and is done element by element. Diagonal elements for this solution are simply taken from the diagonal elements of the double difference covariance matrix and the measurement type is determined using the equations above. For examples if measurement two were a wide land fixed measurement, the M(2, 2) element would be taken from the WL fixed covariance matrix and placed in the hybrid covariance matrix in the same spot.

A fourth functional module 142 performs the covariance matrix element calculation. Off diagonal elements are determined by the relationships between each measurement type. The simplest way to provide the information is to show a complete example and provide the algorithms. For this example the hybrid solution includes each type of measurement in descending order as follows, and each of these measurements is the first measurement in its respective solution type.

L1_fixed
L2_fixed
L1_float
L2_float
WL_fixed
WL_float
NL_Code

The covariance matrix is shown by Equation (10):

$$\begin{bmatrix} C_{\Phi_{1\_fix}}(1,1) & a & c & d & e & e & f \\ a & C_{\Phi_{2\_fix}}(1,1) & h & i & k & k & k \\ c & h & C_{\Phi_{1\_flo}}(1,1) & m & n & n & o \\ d & i & m & C_{\Phi_{2\_flo}}(1,1) & q & q & r \\ e & j & n & q & C_{\Phi_{WL\_fix}}(1,1) & s & t \\ e & j & n & q & s & C_{\Phi_{WL\_flo}}(1,1) & t \\ f & k & o & r & t & t & C_{R_{NL}}(1,1) \end{bmatrix} \quad (10)$$

where the elements of matrix calculated by Equations (11) to (32):

$$a = \sigma^2_{AB\_tropo\_key\_sv} + \left( \frac{\lambda_2^2}{\lambda_1^2} \right) * \sigma^2_{AB\_L1\_iono\_key\_sv} \quad (11)$$

$$b = \sigma^2_{AB\_L1\_m,e\_key\_SV} + \sigma^2_{AB\_tropo\_key\_sv} + \sigma^2_{AB\_L1\_iono\_key\_sv} \quad (12)$$

$$c = \left(1 - \frac{\lambda_1}{\lambda_2 - \lambda_1}\right) * \sigma^2_{AB\_L1\_m,e\_key\_SV} + \sigma^2_{AB\_tropo\_key\_sv} + \left( \frac{\lambda_2 + 2\lambda_1}{\lambda_1} \right) * \sigma^2_{AB\_L1\_iono\_key\_sv} \quad (13)$$

-continued $$d = -\left(\frac{\lambda_2}{\lambda_2 - \lambda_1}\right) * \sigma^2_{AB\_L1\_m,e\_key\_SV} + \sigma^2_{AB\_tropo\_key\_sv} + \left(\frac{2\lambda_2^2 + \lambda_2\lambda_1}{\lambda_1^2}\right) * \sigma^2_{AB\_L1\_iono\_key\_sv} \quad (14)$$

$$e = \left(\frac{\lambda_{WL}}{\lambda_1}\right) * \sigma^2_{AB\_L1\_m,e\_key\_SV} - \left(\frac{\lambda_2}{\lambda_1}\right) * \sigma^2_{AB\_L1\_iono\_key\_sv} + \sigma^2_{AB\_tropo\_key\_sv} \quad (15)$$

$$f = \sigma^2_{AB\_tropo\_key\_sv} - \left(\frac{\lambda_2}{\lambda_1}\right) * \sigma^2_{AB\_L1\_iono\_key\_sv} \quad (16)$$

$$g = \sigma^2_{AB\_L2\_m,e\_key\_SV} + \sigma^2_{AB\_tropo\_key\_sv} + \left(\frac{\lambda_2^4}{\lambda_1^4}\right) * \sigma^2_{AB\_L1\_iono\_key\_sv} \quad (17)$$

$$h = \left(\frac{\lambda_1}{\lambda_2 - \lambda_1}\right) * \sigma^2_{AB\_L2\_m,e\_SV} + \sigma^2_{AB\_tropo\_key\_sv} + \left(\frac{\lambda_2^3 + 2\lambda_1\lambda_2^2}{\lambda_1^3}\right) * \sigma^2_{AB\_L1\_iono\_key\_sv} \quad (18)$$

$$i = \left(1 + \frac{\lambda_2}{\lambda_2 - \lambda_1}\right) * \sigma^2_{AB\_L2\_m,e\_key\_SV} + \sigma^2_{AB\_tropo\_key\_sv} + \left(\frac{2\lambda_2^4 + 2\lambda_2^3\lambda_1}{\lambda_1^4}\right) * \sigma^2_{AB\_L1\_iono\_key\_sv} \quad (19)$$

$$j = -\left(\frac{\lambda_{WL}}{\lambda_2}\right) * \sigma^2_{AB\_L2\_m,e\_key\_SV} - \left(\frac{\lambda_2^3}{\lambda_1^3}\right) * \sigma^2_{AB\_L1\_iono\_key\_sv} + \sigma^2_{AB\_tropo\_key\_sv} \quad (20)$$

$$k = \sigma^2_{AB\_tropo\_key\_sv} - \left(\frac{\lambda_2^3}{\lambda_1^3}\right) * \sigma^2_{AB\_L1\_iono\_key\_sv} \quad (21)$$

$$l = \left(1 - \frac{\lambda_1}{\lambda_2 - \lambda_1}\right)^2 * \sigma^2_{AB\_L1\_m,e\_key\_SV} + \left(\frac{\lambda_1}{\lambda_2 - \lambda_1}\right)^2 * \sigma^2_{AB\_L2\_m,e\_key\_SV} + \sigma^2_{AB\_tropo\_key\_sv} + \left(\frac{2\lambda_1 + \lambda_2}{\lambda_1}\right)^2 * \sigma^2_{AB\_L1\_iono\_key\_sv} \quad (22)$$

$$m = -\left(1 - \frac{\lambda_1}{\lambda_2 - \lambda_1}\right)\left(\frac{\lambda_2}{\lambda_2 - \lambda_1}\right) * \sigma^2_{AB\_L1\_m,e\_key\_SV} + \sigma^2_{AB\_tropo\_key\_sv} + \left(1 + \frac{\lambda_2}{\lambda_2 - \lambda_1}\right)\left(\frac{\lambda_1}{\lambda_2 - \lambda_1}\right) * \sigma^2_{AB\_L2\_m,e\_key\_SV} + \left(\frac{2\lambda_2^3 + 5\lambda_2^2\lambda_1 + 2\lambda_1^2\lambda_2}{\lambda_1^3}\right) * \sigma^2_{AB\_L1\_iono\_key\_sv} \quad (23)$$

$$n = -\left(\frac{\lambda_{WL}}{\lambda_2}\right) * \left(\frac{\lambda_1}{\lambda_2 - \lambda_1}\right) * \sigma^2_{AB\_L2\_m,e\_key\_SV} + \left(\frac{\lambda_{WL}}{\lambda_2}\right) * \left(1 - \frac{\lambda_1}{\lambda_2 - \lambda_1}\right) * \sigma^2_{AB\_L1\_m,e\_key\_SV} + \sigma^2_{AB\_tropo\_key\_sv} - \left(\frac{2\lambda_1\lambda_2 + \lambda_2^2}{\lambda_1^2}\right) * \sigma^2_{AB\_L1\_iono\_key\_sv} \quad (24)$$

$$o = \sigma^2_{AB\_tropo\_key\_sv} - \left(\frac{2\lambda_1\lambda_2 + \lambda_2^2}{\lambda_1^2}\right) * \sigma^2_{AB\_L1\_iono\_key\_sv} \quad (25)$$

$$p = \left(\frac{\lambda_2}{\lambda_2 - \lambda_1}\right)^2 * \sigma^2_{AB\_L1\_m,e\_key\_SV} + \left(1 + \frac{\lambda_2}{\lambda_2 - \lambda_1}\right)^2 * \sigma^2_{AB\_L2\_m,e\_key\_SV} + \sigma^2_{AB\_tropo\_key\_sv} + \left(\frac{2\lambda_2^2 + \lambda_2\lambda_1}{\lambda_1^2}\right) * \sigma^2_{AB\_L1\_iono\_key\_sv} \quad (26)$$

$$q = -\left(\frac{\lambda_{WL}}{\lambda_1}\right) * \left(\frac{\lambda_2}{\lambda_2 - \lambda_1}\right) * \sigma^2_{AB\_L1\_m,e\_key\_SV} - \left(\frac{\lambda_{WL}}{\lambda_2}\right) * \left(1 + \frac{\lambda_2}{\lambda_2 - \lambda_1}\right) * \sigma^2_{AB\_L2\_m,e\_key\_SV} + \sigma^2_{AB\_tropo\_key\_sv} - \left(\frac{2\lambda_2^3 + \lambda_2^2\lambda_1}{\lambda_1^3}\right) * \sigma^2_{AB\_L1\_iono\_key\_sv} \quad (27)$$

$$r = \sigma^2_{AB\_tropo\_key\_sv} - \left(\frac{2\lambda_2^3 + \lambda_2^2\lambda_1}{\lambda_1^3}\right) * \sigma^2_{AB\_L1\_iono\_key\_sv} \quad (28)$$

$$s = \left(\frac{\lambda_{WL}}{\lambda_2}\right)^2 * \sigma^2_{AB\_L2\_m,e\_key\_SV} + \left(\frac{\lambda_{WL}}{\lambda_1}\right)^2 * \sigma^2_{AB\_L1\_m,e\_key\_SV} + \sigma^2_{AB\_tropo\_key\_sv} + \left(\frac{\lambda_2^2}{\lambda_1^2}\right) * \sigma^2_{AB\_L1\_iono\_key\_sv} \quad (29)$$

$$t = \left(\frac{\lambda_2^2}{\lambda_1^2}\right) * \sigma^2_{AB\_L1\_iono\_key\_sv} + \sigma^2_{AB\_tropo\_key\_sv} \quad (30)$$

$$u = s + \lambda_{WL}^2 * C_{mw\_SD\_fl\_key} \quad (31)$$

$$v = \left(\frac{\lambda_{NL}}{\lambda_1}\right)^2 * \sigma^2_{AB\_L1\_M,E\_key\_SV} + \left(\frac{\lambda_{NL}}{\lambda_2}\right)^2 * \sigma^2_{AB\_L2\_M,E\_key\_SV} + \sigma^2_{AB\_tropo\_key\_sv} + \left(\frac{\lambda_2^2}{\lambda_1^2}\right) * \sigma^2_{AB\_L1\_iono\_key\_sv} \quad (32)$$

The cases not covered in the example are the relationships between common solutions. In these cases the following applies:

L1_fixed to L1_fixed is equivalent to b;
L2_fixed to L2_fixed is equivalent to g;
L1_float to L1_float is equivalent to l;
L2 float to L2_float is equivalent to p;
WL_fixed to WL fixed is equivalent to s;
WL_float to WL_float is equivalent to u; and
NL code to NL code is equivalent to v:

A fifth functional module 143 calculates a Relative Position Solution using the Weighted Least Squares Method. The measurements should include every satellite, using the most accurate (smallest variance) measurement available for that satellite. The calculations executed by different steps of the WLS algorithm are shown below. The initialization is performed once at the start of a filter. All other steps are iterated (2 or 3 times) until a solution converges.

Step 1 initializes the baseline vector b (at start of the filter) by Equation (33)

$$x_k^- = 0 \quad (33)$$

Step 2 calculates Measurements and Covariance by Equations (34), (35) and (36):

$$Z = Z_{Hybrid} \quad (34)$$

$$C_z = \Sigma_{Hybrid} \quad (35)$$

$$W = C_z^{-1} \quad (36)$$

Step 3 calculates LOS (Line of Sight) vectors from Ship and Aircraft to Satellite j by Equations (37)-(42):

In the equations, satellite position $\{x^s, y^s, z^s\}$ is from ephemeris and ship position $\{x_A, y_A, z_A\}$ is from an absolute position solution.

LOS Vectors:

$$\text{Ship}(A) \text{ to satellite } j \quad as(j) = \begin{bmatrix} x^s(j) - x_A \\ y^s(j) - y_A \\ z^s(j) - z_A \end{bmatrix} \quad (37)$$

$$\text{Aircraft}(B) \text{ to satellite } j \quad bs(j) = \begin{bmatrix} x^s(j) - x_B \\ y^s(j) - y_B \\ z^s(j) - z_B \end{bmatrix} \quad (38)$$

$$= \begin{bmatrix} x^s(j) - (x_A + \hat{b}_x) \\ y^s(j) - (y_A + \hat{b}_y) \\ z^s(j) - (z_A + \hat{b}_z) \end{bmatrix}$$

Magnitudes of LOS vectors:

$$as\_mag(j) = \|as(j)\|; \text{ and} \quad (39)$$

$$bs\_mag(j) = \|bs(j)\| \quad (40)$$

Predicted SD Measurement (as−bs)

$$dab(j) = as\_mag(j) - bs\_mag(j); \quad (41)$$

Predicted DD Measurements $$Z_k^- = \begin{bmatrix} dab(1) - dab(2) \\ dab(1) - dab(3) \\ \ldots \\ dab(1) - dab(K) \end{bmatrix} \quad (42)$$

using satellite 1 (highest) as reference

Step 4 performs Linearization by evaluating Equations (43)-(45):

Unit LOS Vectors from Aircraft to Satellite j:

$$\begin{bmatrix} 1_x(j) \\ 1_y(j) \\ 1_z(j) \end{bmatrix} = bs(j)/bs\_mag(j) \quad (43)$$

Differences of Unit Vectors $$e_x(1,j) = 1_x(1) - 1_x(j)$$

$$e_y(1,j) = 1_y(1) - 1_y(j)$$

$$e_z(1,j) = 1_z(1) - 1_z(j) \quad (44)$$

H Matrix (Matrix Formed by Differenced Unit Vectors)

$$H = \begin{bmatrix} e_x(1,2) & e_y(1,2) & e_z(1,2) \\ e_x(1,3) & e_y(1,3) & e_z(1,3) \\ \ldots & \ldots & \ldots \\ \ldots & \ldots & \ldots \\ \ldots & \ldots & \ldots \end{bmatrix} \quad (45)$$

Steps 5 computes the Weighted Least Square Relative Position solution by Equations (46)-(49):

Filter Observable:

$$\Delta Z = [Z_k - Z_k^-] \quad (46)$$

WLS Solution and Solution Covariance:

$$\Delta \hat{x} = [H^T W H]^{-1} H^T W \Delta Z \quad (47)$$

$$\hat{x}_k^+ = \hat{x}_k^- + \Delta \hat{x} \quad (48)$$

$$\Sigma_x = [H^T W H]^{-1} \quad (49)$$

The solution is arrived at by transforming each Relative Position Solution and its Covariance from WGS-84 to NED coordinates (north-east-down coordinates at ship reference point).

The final output from the process includes the following data:

Hybrid Relative Position NED
Covariance of Hybrid Relative Position

What is claimed is:

1. A method for calculating position, velocity, and acceleration data for a moving craft using a GPS-based navigation system, comprising:
   selecting a plurality of GPS-derived measurement data types that have the smallest variance for each of a plurality of GPS satellites;
   processing position, velocity, and acceleration components of a relative state function by fusing the selected plurality of GPS-derived measurement data types from the GPS-based navigation system into a weighted least squares algorithm; and
   determining an appropriate covariance matrix for the selected plurality of GPS-derived measurement data types, wherein errors in the position, velocity and acceleration data are minimized.

2. The method of claim 1, wherein at least one of the measurement data types is measured for a ship.

3. The method of claim 1, wherein at least one of the measurement data types is measured for an airborne aircraft.

4. The method of claim 1, wherein at least one of the measurement data types is measured for a stationary point.

5. The method of claim 1, wherein the processing includes the calculation of phase ambiguities.

6. An apparatus for calculating position velocity and acceleration data for a moving craft using a GPS based navigation system, comprising:
   a data acquisition device operable to acquire a plurality GPS-based measurement data types using the GPS based navigation system; and
   a calculating device operable to select, for each satellite, a GPS-based measurement data type having the smallest variance from the plurality of GPS-based measurement data types, and fuse the selected GPS-based measurement data types in a weighted least squares algorithm utilizing an appropriate covariance matrix for the selected GPS-based measurement data types.

7. The apparatus of claim 6, wherein at least one of the GPS-based measurement data types is acquired from the moving craft and at least one of GPS-based measurement data types is acquired from a reference location selected from the group consisting of a ship and a stationary point.

8. The apparatus of claim 6, wherein the calculating device is further operable to calculate phase ambiguities.

9. An airborne navigation system for calculating position, velocity and acceleration data for a moving craft using a GPS based navigation system, comprising:
   a plurality of GPS data acquisition devices operable to determine a plurality of GPS-based position, velocity and acceleration data types of a reference location and the moving craft; and a calculating component operable to select, for each satellite, a GPS-based measurement data type having the smallest variance from the plurality of GPS-based measurement data types, and fuse the selected GPS-based data types in a weighted least squares algorithm utilizing an appropriate covariance matrix for selected GPS-based data types, such that errors in the position, velocity and acceleration data are minimized.

10. The system of claim 9, wherein at least one of the data types is measured from the moving craft, and at least one of the data types is measured from the reference location selected from the group consisting of a ship and a fixed location.

11. The system of claim 9, wherein the calculating component is further operable to calculate phase ambiguities.

12. A method of calculating position data of a moving craft by fusing different types of GPS-based measurement data, comprising:
receiving GPS-based measurement data at the moving craft and a reference location;
computing position, velocity, and phase ambiguity data at the reference location;
transmitting the computed data from the reference location to the moving craft; and
combining, at the moving craft, the CPS-based measurement data and the computed data to produce a relative vector solution between the location of the moving craft and the reference location, the combining comprising selecting GPS-based measurement data having the lowest variance for each of a plurality of GPS satellites, calculating an appropriate weighting covariance matrix for the selected data, and fusing the selected data in a weighted least squared algorithm utilizing the calculated covariance matrix.

13. The method of claim 12, wherein the moving craft is an airborne aircraft.

14. The method of claim 12, wherein the reference location is a ship.

15. A method of calculating a Precision Relative State (PRS) solution for an airborne navigation system on a first moving craft by processing a plurality of different types of GPS-derived measurement data, comprising:
computing code range and phase range values from measurements and variances from data received from GPS satellites;
determining Wide Lane Float Ambiguities and a covariance value;
calculating Double-Difference measurements at a specified time based on a second moving craft;
determining first and second frequency float ambiguities and a covariance calculation from the Double-Difference measurements, the Wide Lane Float Ambiguities, and the covariance value;
selecting GPS-derived measurement data values having the smallest variance for each of the GPS satellites from the computed code range and phase range values;
building a covariance in matrix including calculating cross-correlation terms among the selected GPS-derived measurement data values; and
calculating the PRS solution and its covariance using the covariance matrix by a weighted least squares (WLS) algorithm.

16. The method of claim 15, wherein the step of calculating the PRS solution and its covariance includes repeating the calculation until the PRS solution converges.

17. The method of claim 15, wherein the data received from GPS satellites include data from at least four Global Positioning System (GPS) satellites.

18. A landing system for a moving craft, comprising:
a reference location having means for computing and transmitting reference location position, velocity, and estimated wide lane phase ambiguity data using a weighted least squares algorithm;
a receiver on the moving craft that is operable to receive GPS measurement data from a GPS satellite constellation and the computed data from the reference location; and
a calculating system associated with the receiver that is operable to calculate position data for the moving craft by fusing the measurement data and the reference data with a weighted least squares (WLS) algorithm.

19. The landing system of claim 18, wherein the moving craft has a navigation system operable to combine the GPS measurement data and the computed data for producing a relative vector solution between the moving craft's location and the reference location.

20. The landing system of claim 18, wherein the reference location has a Relative Navigation (RelNav) system operable to calculate the estimated wide lane phase ambiguity data for the reference location.

21. The landing system of claim 20, wherein the estimated wide lane phase ambiguity data are transmitted to the moving craft by the reference location.

22. An Airborne Relative Navigation (RelNav) system for calculating a relative position and a velocity vector between a ship and an airborne aircraft and for providing this information as relative state to the aircraft, comprising:
a Measurement Management and Validation function that processes and validates incoming measurement data;
a Relative Measurements function that calculates Double-Difference measurements and variance components from Single-Difference measurements;
a Wide Lane Ambiguities function that determines wide lane float ambiguities and a first covariance value;
an ambiguities function that determines first and second frequency float ambiguities and a second covariance value; and
a relative state function that computes a relative state and covariance solution from the wide lane float ambiguities, the first covariance value, the first and second frequency float ambiguities and the second covariance value, and that provides the solution to an avionic system on the aircraft using a weighted least squares algorithm.

23. The RelNav system of claim 22 wherein the covariance values include corrections for at least one of: multi-path, noise, ionosphere, or troposphere errors.

24. The RelNav system of claim 22, wherein the covariance values are selected from the group consisting of at least one of multi-path, noise, ionosphere corrections, and troposphere corrections.

25. A Precision Relative State (PRS) computational module for calculating a PRS solution for a navigation system on a moving craft, employing a weighted least squares (WLS) algorithm for processing a plurality of different types of Global Positioning System (GPS)-derived measurement data, comprising:
an input computing module operable to compute a plurality of code range and phase range values from measurement and covariance data from a satellite;
a data selection module operable to select data based on measurement variances;

a covariance matrix-building module operable to assemble GPS-derived data for covariance matrix element calculation;

a covariance matrix element calculation module for determining values for the covariance matrix elements; and PRS solution calculation module operable to calculate the PRS solution and its covariance using the covariance matrix by the WLS algorithm.

26. The PRS computational module of claim 25, wherein the input computing module includes measurement data from every available Global Positioning System (GPS) satellite.

27. The PRS computational module of claim 25, wherein the WLS algorithm includes:

an operation for calculating measurements and covariance;

an operation for calculating Line of Sight (LOS) vectors from a ship and an aircraft to a Satellite;

an operation for performing linearization of LOS vectors;

an operation for calculating WLS of relative position solutions; and an operation for transforming each relative position solution and its covariance from World Geodetic System of 1984 coordinates to North-East-Down coordinates at a ship reference point.

28. The PRS computational module of claim 25, wherein the relative position solution calculation module operates iteratively until the PRS solution converges.

29. The PRS computational module of claim 26, wherein the data selection module is further operable to select data having the lowest measurement variances for each of the available GPS satellites.

* * * * *

UNITED STATES PATENT AND TRADEMARK OFFICE
CERTIFICATE OF CORRECTION

PATENT NO. : 7,683,832 B2 Page 1 of 1
APPLICATION NO. : 11/838133
DATED : March 23, 2010
INVENTOR(S) : Hansen, Jr. et al.

It is certified that error appears in the above-identified patent and that said Letters Patent is hereby corrected as shown below:

In column 6, line 14, delete "For examples" and insert -- For example --, therefor.

In column 6, line 55, delete "to (32:" and insert -- "to (32):" --, therefor.

In column 11, line 26, delete "CPS-based" and insert -- "GPS-based" --, therefor.

Signed and Sealed this

Twenty-second Day of June, 2010

David J. Kappos
*Director of the United States Patent and Trademark Office*